April 10, 1956     C. B. NEEL, JR     2,741,119
COMPENSATION ELEMENT FOR HEATED-WIRE-LIQUID-WATER-CONTENT METER
Filed Oct. 4, 1954

INVENTOR.
CARR B. NEEL, JR.
BY
ATTORNEYS

United States Patent Office 2,741,119
Patented Apr. 10, 1956

2,741,119

COMPENSATION ELEMENT FOR HEATED-WIRE-LIQUID-WATER-CONTENT METER

Carr B. Neel, Jr., Palo Alto, Calif.

Application October 4, 1954, Serial No. 460,286

6 Claims. (Cl. 73—29)

(Granted under Title 35, U. S. Code (1952), sec. 266)

The invention described herein may be manufactured and used by or for the Government of the United States of America for governmental purposes without the payment of any royalties thereon or therefor.

This invention relates to apparatus for measuring the liquid-water content of clouds. More particularly the invention pertains to devices for compensating liquid-water measuring apparatus for errors due to changes in air temperature, altitude and airspeed.

In a copending application of this applicant, Serial No. 329,754, filed January 5, 1953, apparatus is described for metering the liquid-water content of clouds in which use is made of a bare loop of metal wire heated above the boiling point of water by a current source and placed in the air stream of an airplane, for example, where it is subjected to impingement of liquid-water particles. The evaporation of the water on the loop produces a cooling effect which results in a change of electrical resistance in the wire and the current change resulting is therefore, a measure of cloud water content.

It has been found that errors of instrument reading due to altitude, speed and air temperature may become important and require correction and, to this end, at least one instrument has been devised for measurement of liquid-water in air tunnels, for example, which aims to compensate for these errors. In this prior instrument the compensation element is placed perpendicular to the air stream and in a region shielded from water contact by an air-foil shaped body, so that it is affected only by air velocity and temperature in a manner similar to the sensing element.

Deficiencies have been found in this mode of compensation as follows: (a) the correct location of the compensator relative to the air foil to obtain the required droplet shielding and air flow conditions is critical and must be determined by experiment; (b) due to the critical nature of the element location, conditions at the element vary excessively for changes in airplane attitude, where the device is applied to airplane use; and (c) location of the compensation element behind a shielding body generally requires the physical separation of the sensing and compensation elements which may be an important disadvantage from the standpoint of compactness and ease of installation.

It is, therefore, an important object of the invention to provide a compensation device in liquid-water measuring apparatus which is free of critical restrictions as to location in the air stream. An object, also is to provide a compensating device which may be placed in the liquid-water measuring equipment without experimental determinations of a point of best use. Another object is to insure satisfactory airplane use without disturbance due to normal variations in airplane flight altitude. An additional object is to provide a compensating device permitting close placement relative to the sensing device.

Other objects and features of the invention will appear on consideration of the following description of a specific embodiment of the invention, including drawings in which.

Figure 1:
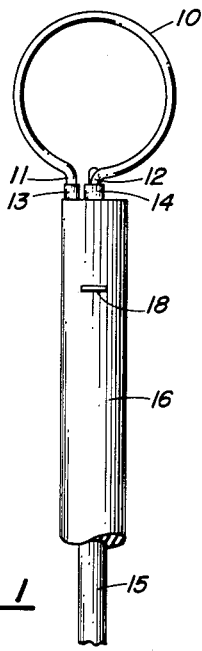
Fig. 1 is a detail of the sensing loop of the apparatus for liquid-water heating.

Referring to Fig. 1, there is shown a sensing loop 10 of known temperature-resistance characteristics which is provided with end legs 11 and 12 fixed within copper tubes 13 and 14 and connected to outlet cable 15, both the tubes and cable being enclosed by support casing 16. This casing 16 is affixed to a spacing and support strip 17 (Fig. 2) by attachment of lugs 18 on the casing to the strip of opposite sides of an end opening 19. The opening diameter is of such value as to provide substantial clearance between the strip and casing to minimize heat transference and permit easy assembly.

The compensating element consists of a single bare, unshielded and straight metal wire 20 having approximately the same temperature coefficient of resistance as the sensing wire, and mounted on the support strip 17 between the loop support casing 16 and a similar casing 21 is an opening 27 adjacent the other end of the strip. Casing 21 supports copper tube 22 and cable 23, and wire 20 has terminal legs 24 fastened to the copper tube connectors 14 and 22.

Reference is now made to the circuital arrangement. A bridge unit is disclosed including the two divided bridge circuits 30 and 31 connected to the electric power leads 28 and 29 at points 32 and 33. Bridge circuit 30 includes in series the wire-loop sensing element 10 as one arm and a standard bridge resistance 34 as the other arm. Bridge circuit 31 includes in series the adjustment resistor 35, the compensation wire 20 and standard bridge resistance wire 36. Point 37 between resistances 10 and 34 in bridge circuit 30 and point 38 between resistances 20 and 36 in bridge circuit 31 are joined by the bridge wire 40 and bridge meter 41. Supplementary controls include variable resistor 35 in bridge circuit 31 and bypass variable resistor 42 from point 32 to point 37. 43 is the meter resistor.

Figure 2:
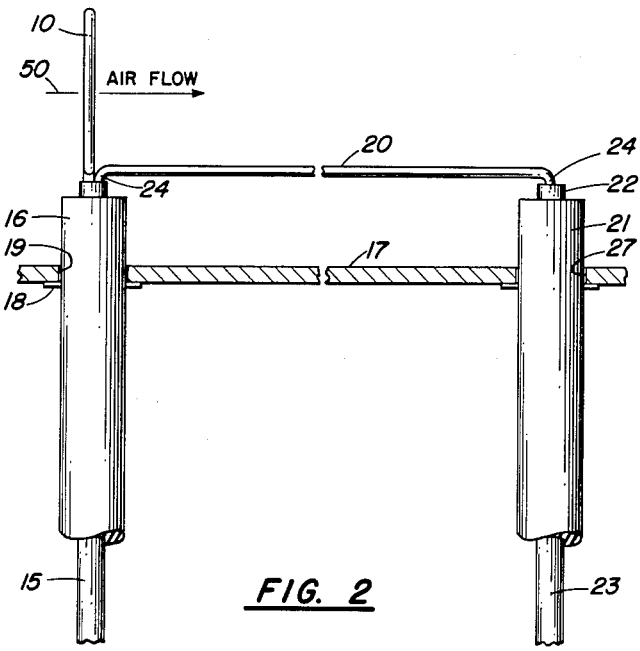
Fig. 2 is side view of the apparatus showing the sensing loop in direct proximity to the compensating device.
Figure 3:
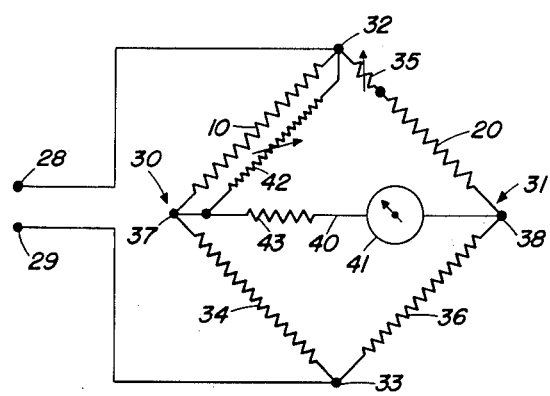
Fig. 3 is a diagram of a circuit, including the sensing and compensating elements, for securing the corrected determination of cloud liquid-water content.

In operation, the unit is mounted in the air stream in such position as to place loop 10 at right angles and transverse to the normal air flow as indicated by arrow 50 in Fig. 2. In this position, the compensating wire 20 is alined with the air flow and hence the cloud water droplets do not strike this wire, while the loop wire 10, in the direct flow path is constantly subjected to droplet impact. Both wires 10 and 20 are heated by the bridge power source to a temperature above the boiling point of water and thus the temperature and resistance of the loop wire 10 is modified by evaporation whereas evaporation does not disturb the temperature of wire 20. Moreover, both sensing and compensating wires are similarly affected by ambient temperatures, pressure and airspeeds, and since these two wires are in separate bridge circuits 30 and 31 the effect of these variables is balanced out, thus leaving an unbalance in the bridge due solely to the evaporation of liquid-water on loop 10. In this way, an accurate determination of cloud water content is obtained, without the necessity of critical locations experimentally determined, and without disturbance from normal variations in flight altitude when applied to airplane use.

The indicated bridge unit is conventional and may be varied for specific needs. Also, the length and diameter of the compensating wire are not critical, it being desirable, however, that the diameter of compensator wire 20 be less than that of loop wire 10, and that the diameter of loop wire 10 be of the order of 0.02 to 0.10 inch. In addition, while the loop 10 is shown as flat, structural conditions may require off-set sections; and while a loop form is indicated, other forms including a straight wire are usable provided the right angled relationship to the compensator wire 20 is maintained.

Other modifications and variations are possible in the light of the above teachings, and it is therefore apparent that, within the scope of the appended claims, the invention may be practiced otherwise than as specifically described.

This application is a continuation in part of the application hereinabove referred to.

What is claimed is:

1. Apparatus for cloud liquid content determination comprising a bare electrically conducting loop wire, a bare electrically conducting straight wire positioned approximately parallel with axis of said loop wire, electrical means for heating said wires, and bridge means for obtaining the differential of current flow through said loop wire and straight wire while said wires are being heated in a moving cloud stream.

2. Apparatus for cloud liquid content determination as defined in claim 1, said loop and straight wires having approximately the same electrical resistance characteristics.

3. An electrical bridge unit for cloud liquid content determination comprising two electric power terminals, two parallel bridge circuits between said terminals, an electrically conducting loop wire in one bridge circuit, an electrically conducting straight wire positioned approximately parallel to the loop axis in the other bridge circuit, a bridge line including an electrical meter connected between said bridge circuits for indicating the differential in current flow in said bridge circuits when said loop and straight wires are heated and lying in a cloud flow stream with the straight wire alined with said stream, and means for supplying electric power to said terminals and heating energy to said loop and straight wire.

4. In apparatus for cloud liquid content determination, a strip support having single terminal openings, casings mounted in each of said openings, a metal loop wire mounted at the end of one of said casings, a straight metal wire connected to said loop wire and between said casings, and electric power terminals connected to the loop and straight wire ends, the main sections of said loop wire lying in planes approximately at right angles to said straight wire and said loop and straight wires having approximately the same temperature coeffiicients of electrical resistance.

5. Water content determination apparatus as defined in claim 4, the diameter of said straight wire being less than that of said loop wire.

6. Apparatus for determination of liquid content in clouds subject to variation in liquid content, altitude, temperature and pressure which comprises first single means sensitive simultaneously to the sum effect of variations in all four of said variables, second single means sensitive simultaneously to the sum effect of variations in only three of said variables including altitude, temperature and pressure, and instrument means connected to said first and second single means for indicating the differential of the sum effects of each of said first and second single means, whereby the cloud liquid content may be determined for any simultaneous condition of all of said variables, said first single means including a bare metal looped wire adapted for placement transversely to cloud flow and said second single means including a straight bare metal wire adapted for placement parallel approximately to the axis of said looped wire in line with the cloud flow.

References Cited in the file of this patent

UNITED STATES PATENTS 2,501,377     Cherry               Mar. 21, 1950